Patented Aug. 15, 1950

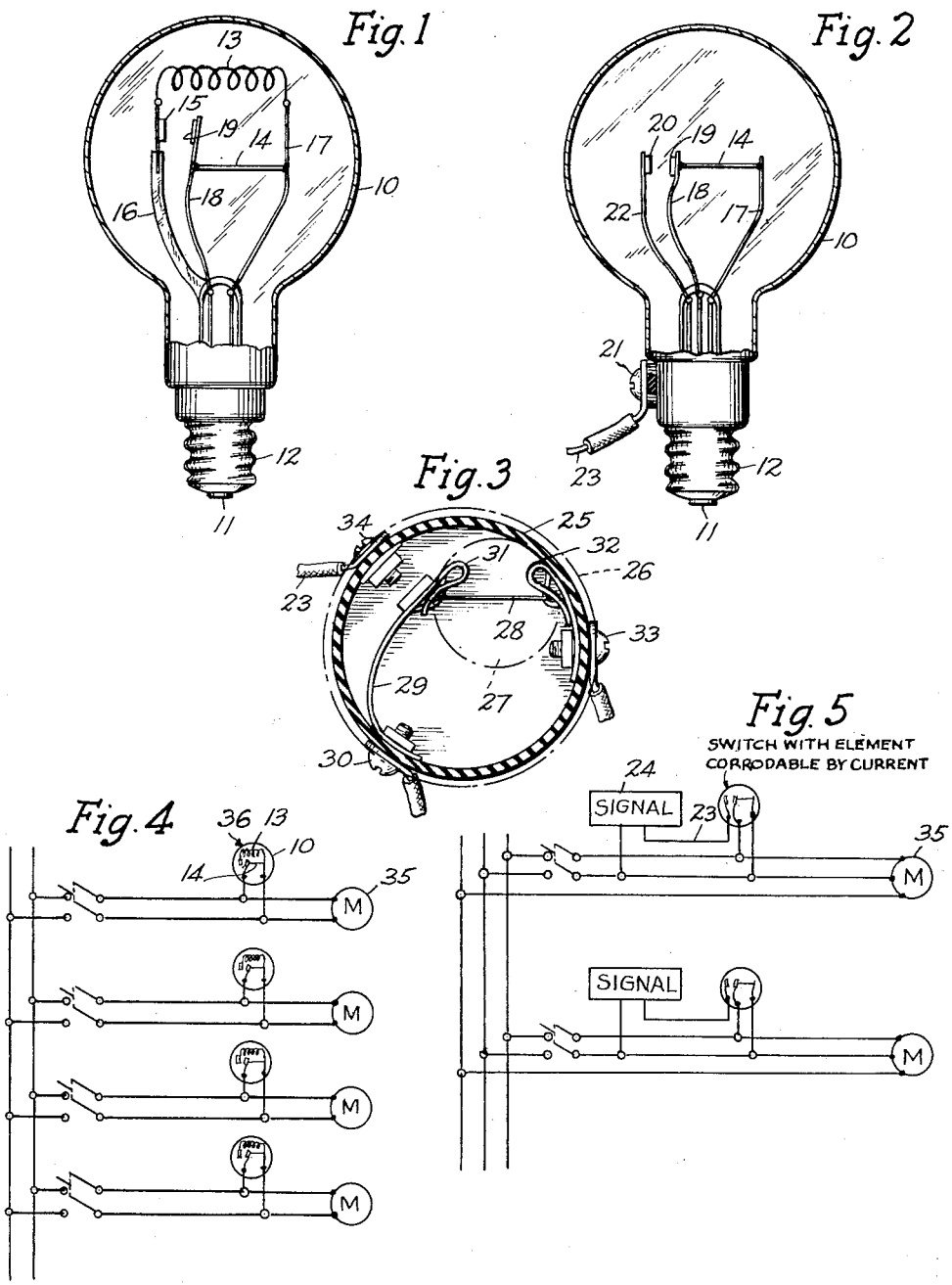

2,518,909

UNITED STATES PATENT OFFICE 2,518,909

SIGNAL RESPONSIVE TO CURRENT-PASSAGE TIME

Edwin G. Krakauer, Brooklyn, N. Y., assignor of one-fourth to Abraham Krakauer, one-fourth to Daniel Krakauer, and one-fourth to C. Leonard Krakauer Application December 13, 1947, Serial No. 791,624

3 Claims. (Cl. 177—311)

This invention relates to signalling devices and systems responsive to the passage of current therethrough for a predetermined cumulative long period of time on the order of months, and to the method of signalling that such long period of current-passage time has elapsed.

In modern factories where electric motors are generally used to operate machinery, the motors and the machines require infrequent but periodic maintenance or attention such as oiling, greasing, cleaning, part replacement and the like at intervals usually not less than one month, depending on the usage to which the mechanism is subjected and the type of mechanism employed.

While in some plants, a record is kept of the time when each machine is serviced, when long periods such as approximately six months elapse, or when the machine has had a certain amount of usage, for example when it has performed about 15,000,000 revolutions between the servicing of such parts as anti-friction bearings, motor brushes and the like, the records are frequently overlooked or mislaid or forgotten, with failure to perform the required service and consequent damage to the machine. Parts to which access is difficult are also frequently overlooked despite such records, when the time for service, which may not be for several months from the previous servicing operation, has arrived. Furthermore, when the machine is idle, as during seasonal or holiday lay-offs, there is of course less wear thereof and the service need not be performed so frequently, while the opposite is true in cases where the machine is used on overtime operations. Hence, records are not effective to provide accurate information respecting the time when the service is due, especially when such service is needed at intervals of more than a month.

The present invention therefore contemplates the provision of an electrically operated signalling system including a visible or audible signal energized only after the electrically operated machine with which the signal is used, has operated a predetermined cumulative period of time.

The invention further contemplates the provision of means for indicating clearly as by a signal when such machine has been operated for the predetermined period and therefore requires servicing.

The invention further contemplates the provision of a means for indicating or determining when any given machine of a number of machines requires service, said means including a corrodible element energized simultaneously with the energization of the motor of the machine with which the element is used to cause the element gradually to deteriorate and then to fail after current has passed therethrough for the predetermined period between required servicing operations and by such failure to close a switch to a signal.

The invention further contemplates the provision of an inexpensive readily replaceable spring switch provided with an element which fails or ruptures after current has passed therethrough for a predetermined time, thereby to release the spring and to close the switch.

In carrying out the invention, generally, the switching device employs an element acted on by the current passing therethrough to cause failure of the element in a predetermined long period of time, for example usually not less than one month nor greatly in excess of six months, though as has been indicated, the elapsed time period is subject to considerable variation. The element is under tension, normally holding back a spring switching member, which when released by the corrodible element, closes the circuit to a signal of any desired type, actuation of the signal indicating that the predetermined operating time interval has elapsed. The corrosion time of the element under the action of the current may be controlled and predetermined in numerous ways depending on many factors which will be more fully explained hereinafter, but which are well understood by those concerned in preventing such corrosion and lengthening, instead of predetermining the life of, the filaments or terminals of electric lamps, radio tubes, electric heaters, batteries and the like electrical or electronic devices wherein a filament, plate, terminal or other conductor conducts current for heating, illuminating, motive or electronic purposes and is subject to deterioration under the action of the current.

The invention may also be carried out by deliberately inducing slow corrosion of the tensioned element as by subjecting it to the corroding action of an electrolyte in the proper surroundings and only when current passes through the element, so that the element will be so weakened in the predetermined time of operation of the device that it will fail at the end of that time. Several typical forms of the invention have been shown in the drawings, in which Fig. 1 is a sectional view of an evacuated illuminating signal lamp and switch combined to which the invention has been applied.

Fig. 2 is a similar view of an evacuated envelope enclosing the switching device and intended for use with a separate signal.

Fig. 3 is a sectional view of a casing of heat resisting and insulating material adapted to have a cover removably secured thereto and enclosing a switch designed to actuate a separate signal.

Fig. 4 is a wiring diagram of a number of electric motors equipped with the signal switch shown in Fig. 1 and illustrating the mode of executing the method hereof.

Fig. 5 is a similar diagram but showing the motors equipped with a current-corrodible switch such as that shown in Fig. 2 or Fig. 3.

In the practical embodiment of the invention shown by way of example in Fig. 1, the envelope 10 may be of glass or the like transparent or translucent material evacuated in the usual manner or partly evacuated and provided with the usual terminals 11 and 12. As shown, the terminal 11 is of the screw thread type to permit the lamp to be screwed into a conventional electric light socket with the terminal 12 in contact with one of the socket terminals and the lamp terminal 11 in contact with the other terminal of the socket. It will be understood, however, that any well known type of connection into an electric circuit may be used instead, such as a pronged plug or bayonet socket in a manner which is well understood and needs no illustration. Connected at one end only to one of the lamp terminals is the signal filament 13 adapted to light up and to emit a warning light when energized, which occurs only when the corrodible element 14 fails. The filament 13 terminates at its other end in a fixed contact member as 15 suitably supported within the envelope as by the insulator 16. To support the filament a relatively rigid conductor 17 leads from the lamp terminal and is connected to the filament.

The spring switch member 18 is connected to the other lamp terminal at one end, and at its other end carries the contact member 19 adapted to contact with the fixed contact member 15 when permitted to do so and thereby to close the circuit to the lamp. Normally however, the members 15 and 19 are maintained out of contact for a predetermined current-passage time by the tensioned corrodible element 14 which is connected at one end to the switch member 18 and at its other end to the conductor 17. When the element 14 is sufficiently weakened or corroded by, or otherwise deteriorates under the action of, the current passing therethrough over a long time period, to the extent that it can no longer resist the pull of the spring member 18, the element fails and the switch closes to carry the members 15 and 19 into contact, thereby to energize the filament 13 and to light it, indicating that the machine corresponding to the lighted lamp requires attention.

Control of the life of the element 14, as hereinbefore indicated, may be attained in a considerable number of different ways, it being understood that elements differing in dimensions, shape and material to correspond to different operating voltages and different burn-out times may be supplied in different lamps to afford a selection meeting any operating requirements. For lamps intended for relatively long operating times, the envelope 10 may be evacuated to the limit as in ordinary illuminating lamps. For other operating times, the residual gas pressure within the envelope may be slightly higher and may be attained by a residue of air or other oxidating or corroding gas as may be found convenient.

In general, the element which biases the spring switch member 18 to its open position may be caused to fail by oxidation or corrosion occurring only after current has passed therethrough for the predetermined time. Or, if desired, the connections by means of which the element is secured to the members 17 and 18 may be similarly caused to fail. It being understood that owing to the limited amount of air or other gas in the envelope, oxidation at room temperatures is immaterial in effect, the element 14 or its connections should be so proportioned that it heats up sufficiently to deteriorate to the point of rupture in the required current-passage time with the voltage to which the element is subjected.

With a given constant voltage and a given degree of vacuum or of air or gas pressure within the envelope, the predetermined life of the element is controlled by the following factors: the metal selected (such as steel, nickel, copper, tungsten or other metals or alloys thereof); the cross sectional shape (circular, square, rectangular and the like); the cross sectional area (preferably the minimum area necessary should be selected); the length (should also preferably be a minimum); the shape into which the element is bent or formed (should be such as not to deform under heat and tension); and the type of connections and supports (the fixed type is preferred). At least some of these factors govern the resistance of the element to current and hence determine the temperature at which the element normally operates. It being desirable that the lamp consume a minimum of current over the usual long period of its life, the metal and the proportions of the element are selected accordingly to keep it as small as possible and to enable it to heat with slow deterioration at the minimum temperature effective for this purpose.

It will be understood that deterioration of the element may be attained in other ways than by heat and oxidation, provided that such deterioration occurs only on the passage of current. For example, the element may be subjected to the action of an electrolyte in the form of a suitable liquid in an open top container in an obvious manner, the element constituting one of the terminals through which the current passes as it flows between the anode and the cathode through the electrolyte.

It will also be understood that the switch above described or a similar spring switch of a well known type biased to open position, but according to the invention hereof, including an element slowly destructible by current, may be used alone to control a remote signal. The separate signal may be arranged at the machine to be serviced or on a panel together with similar signals for other machines at a central point. In Figs. 2 and 3, modified forms of the switch without the signal filament are shown and in Fig. 5 is shown the wiring diagram therefor.

Referring to Fig. 2, the filament 13 and the fixed contact 15 have been omitted and are replaced by the fixed contact member 20 connected to an independent lamp terminal as 21 by the rigid conductor 22. A wire as 23 leads to one of the terminals of the electrically operated visual or audible signal 24 (Fig. 5). The conductor 17 holding one end of the element 14 is connected to one of the lamp terminals as 12, while the spring switch member 18 carrying the contact member 19 is connected to the other lamp terminal as 11. When the element 14 fails after the predetermined time of current passage therethrough, the switch is closed to the signal 24 and said signal is operated.

In cases where it is desirable that the corrodible element be replaceable, the switch may be partly or entirely enclosed in a suitable casing of insulating material such as porcelain, thermosetting resin or the like as shown in Fig. 3. Said casing as 25 may be provided with a removable cover as 26 screwed to the casing and having a transparent panel 27 as shown by the dash-dot lines of Fig. 3, through which panel the destructible element 28 may be viewed when desired. The spring switch member 29 is connected at one end to a suitable terminal as 30 passing through the wall of the casing, and at its other end is provided with a looped quickly attachable spring connection 31 of a well known type adapted to receive and removably hold an end of the element 28. The other end of the element is removably attached to a similar looped spring connection 32 secured to the terminal 33, which together with the terminal 30, is connected in the line to the motor of a machine. The third terminal 34 passing through the casing is connected to one terminal of the signal 24 by the wire 23 in the same manner as the switch of Fig. 2.

In Fig. 4 is shown the wiring diagram for a typical installation, four motors as 35 being shown to operate four machines requiring service from time to time. A combined signal and switch 36 having a current-corrodible element is connected in parallel with each motor. Passage of current through the motor and the element for a predetermined number of revolutions of the motor or for a predetermined period of operating time of the motor destroys the element and permits the switch to close the circuit to the signal and operate the signal, consisting in this case of an incandescent filament. In Fig. 5, the switch of Figs. 2 or 3 is employed with the separate signal 24 as hereinbefore explained.

It will be seen that I have provided a simple, effective and relatively inexpensive means responsive to predetermined cumulative operating time of an electrically operated unit of any nature for actuating a signal on the lapse of such time regardless of seasonal layoffs or overtime operation, so that the observer is apprised of such lapse without other aid such as records or the like, and that the invention is well adapted to meet the requirements of practical use.

While certain specific embodiments of the invention have herein been shown and described, various obvious changes may be made therein without departing from the spirit of the invention defined in the appended claims.

I claim:

1. In combination, an electrically driven motor, a current-conducting line to said motor, a first switch in said line to energize and to deenergize the motor, and a signal device interposed in the line in parallel with the motor and normally inoperative to produce a signal, said device having a second switch therein controlling the signal and including a metallic element receiving current from the line and incalescent only when the first switch is closed to energize the motor and of such material size and shape as to corrode to failure when a predetermined total amount of current of substantially uniform intensity has passed intermittently therethrough and through the motor, said element normally maintaining the second switch to the signal open and releasing the second switch to operate said signal on the failure of said element by rupture as the result of such corrosion.

2. In combination, an electrically driven motor, a combined switch and signal lamp in the line to the motor and including a fixed metallic filament receiving current only when the motor receives current, said filament normally maintaining the switch open until failure of the filament, the life of said filament being predetermined by the size, shape and type of metal therein and being equal to the time interval between service operations required by the motor, a second filament arranged to be energized when the switch is closed thereby to convert the switch to a lamp, said second filament being of such material, size and shape as to become incandescent when energized by current conducted thereto by the switch.

3. In combination, an electrically driven motor, a normally open signal switch in the line to the motor, said switch being adapted to close after the motor has operated intermittently for a predetermined cumulative period of time, said switch including a metallic tensioned element of such material size and shape as to become incalescent and to weaken under the action of current passing to the motor to the point of failure of said element only at the end of said period and not sooner, said element receiving current only when the motor receives current and means responsive to the failure of the element by rupture to close the switch, and an electrically operable signal in the line to the motor and operated by the current to the motor only when the switch is closed.

EDWIN G. KRAKAUER.

REFERENCES CITED

The following references are of record in the file of this patent:

UNITED STATES PATENTS

| Number | Name | Date |
|---|---|---|
| 645,588 | Doddridge | Mar. 20, 1900 |
| 1,456,568 | Quandt | May 29, 1923 |
| 1,521,176 | Frank | Dec. 30, 1924 |
| 1,830,216 | Anderson | Nov. 3, 1931 |
| 1,896,218 | Bruno | Feb. 7, 1933 |
| 2,049,338 | Trope | July 28, 1936 |
| 2,435,907 | Schirokauer | Feb. 10, 1948 |
| 2,457,879 | Earle | Jan. 4, 1949 |

FOREIGN PATENTS

| Number | Country | Date |
|---|---|---|
| 375,657 | Great Britain | June 30, 1932 |